US010267448B2

(12) United States Patent
Ackerman et al.

(10) Patent No.: US 10,267,448 B2
(45) Date of Patent: Apr. 23, 2019

(54) DEVICE TO HEAT FLEXIBLE HOSE CONNECTORS FOR TRANSPORT VEHICLES

(71) Applicant: Bani-Asaf Inc., Toronto (CA)

(72) Inventors: Wayne Ackerman, Oshawa (CA); Anab Khan, Toronto (CA)

(73) Assignee: Bani-Asaf Inc., Toronto, Ontario (CA)

( * ) Notice: Subject to any disclaimer, the term of this patent is extended or adjusted under 35 U.S.C. 154(b) by 1071 days.

(21) Appl. No.: 14/262,401

(22) Filed: Apr. 25, 2014

(65) Prior Publication Data

US 2015/0308600 A1    Oct. 29, 2015

(51) Int. Cl.
*H05B 3/06*      (2006.01)
*F16L 53/38*     (2018.01)
(Continued)

(52) U.S. Cl.
CPC ............. *F16L 53/38* (2018.01); *F16D 66/00* (2013.01); *H05B 3/54* (2013.01); *H05B 3/58* (2013.01);
(Continued)

(58) Field of Classification Search
CPC .. F16D 2066/001; F16D 66/00; F16L 53/008; H05B 2214/02; H05B 3/54; H05B 3/58
USPC ....... 219/298, 299, 300, 301, 307, 308, 522, 219/547, 200, 201, 208, 280, 296, 306, 219/316, 318, 335, 336, 523, 534–535, 219/528, 544, 549; 392/465, 468, 469, 392/472, 478, 479; 285/31, 32, 354, 41;
(Continued)

(56) References Cited

U.S. PATENT DOCUMENTS 1,884,104 A * 10/1932 Moore .................... B21B 28/02
                                                  29/402.17
2,142,702 A *  1/1939 Sparks .................... B21K 1/24
                                                  29/890.13
(Continued)

FOREIGN PATENT DOCUMENTS

FR       2559874 A1    8/1985
JP    2014007111 A     1/2014
(Continued)

OTHER PUBLICATIONS

WO2009149793A1_translation.pdf.*
(Continued)

*Primary Examiner* — Dana Ross
*Assistant Examiner* — Ket D Dang
(74) *Attorney, Agent, or Firm* — Fish & Richardson P.C.

(57) ABSTRACT

A portable heating device for a fluid coupling in large transport vehicles and a method of using the same. The coupling includes a first coupling member and a second coupling member which are selectively engageable with each other. The heating device includes a jacket having a bore within which at least a portion of the fluid coupling is selectively received. The ends of the jacket define openings to the bore and these openings are selectively closed by fasteners which are engaged with a locking member. A heating assembly is provided to heat the coupled first and second coupling members. When the openings to the bore are closed, the jacket retains heat therein. The jacket may include insulation and a door that is selectively openable to gain access to a shut-off valve on the coupling.

28 Claims, 17 Drawing Sheets

(51) Int. Cl.
*F16D 66/00* (2006.01)
*H05B 3/54* (2006.01)
*H05B 3/58* (2006.01)

(52) U.S. Cl.
CPC .... *F16D 2066/001* (2013.01); *H05B 2214/02* (2013.01)

(58) Field of Classification Search
USPC ......... 174/47, 71 R; 138/33, 35; 264/171.24, 264/146, 297.2, 297.5, 299, 328.1, 454
See application file for complete search history.

(56) References Cited

U.S. PATENT DOCUMENTS

| | | | | |
|---|---|---|---|---|
| 2,216,468 A | * | 10/1940 | Farrar | F16L 25/0036 285/226 |
| 2,457,633 A | * | 12/1948 | Borg | F16L 19/041 285/331 |
| 2,556,116 A | * | 6/1951 | Smith | B21B 23/00 134/19 |
| 2,739,829 A | * | 3/1956 | Cundiff | B29C 65/364 138/177 |
| 3,183,025 A | * | 5/1965 | Lynch, Jr. | F16G 11/02 174/168 |
| 4,423,311 A | * | 12/1983 | Varney, Sr. | E03B 7/14 138/33 |
| 4,556,082 A | | 12/1985 | Riley | |
| 4,930,543 A | | 6/1990 | Zuiches | |
| 5,286,952 A | * | 2/1994 | McMills | B29C 61/006 156/105 |
| 5,714,738 A | * | 2/1998 | Hauschulz | F16L 53/35 219/535 |
| 5,883,364 A | * | 3/1999 | Frei | H05B 3/58 219/535 |
| 6,211,493 B1 | * | 4/2001 | Bouman | E01C 11/265 219/213 |
| 6,710,312 B2 | * | 3/2004 | Bieker | H05B 3/34 219/528 |
| 7,762,283 B2 | * | 7/2010 | Sasaki | F16L 59/021 138/149 |
| 2007/0183758 A1 | * | 8/2007 | Bradenbaugh | F24H 9/2021 392/478 |
| 2007/0199775 A1 | * | 8/2007 | Yasukawa | B60T 13/741 188/73.1 |
| 2009/0134196 A1 | * | 5/2009 | Mulushoff | H05B 3/58 227/130 |
| 2009/0179022 A1 | * | 7/2009 | Ellis | F16L 53/008 219/228 |
| 2012/0125913 A1 | * | 5/2012 | Song | F16L 53/008 219/546 |
| 2013/0323939 A1 | * | 12/2013 | Brown | B61G 5/10 439/34 |

FOREIGN PATENT DOCUMENTS

WO WO 2009149793 A1 * 12/2009 ............ F16L 53/005
WO WO2009149793 A1 12/2009

OTHER PUBLICATIONS

International Application No. PCT/IB2015/052761, Notification of Transmittal of the International Search Report and the Written Opinion of the International Searching Authority, dated Jun. 16, 2015, 9 pages.

* cited by examiner

DEVICE TO HEAT FLEXIBLE HOSE CONNECTORS FOR TRANSPORT VEHICLES

BACKGROUND OF THE INVENTION

Technical Field

This invention relates generally to large transport vehicles such as tractor trailers, buses, and trains including locomotives and rail cars. More particularly, this invention relates to fluid couplings, both air and liquid couplings, for fluid systems, such as air brake systems, on large transport vehicles. Specifically a portable device is disclosed which is engageable around a fluid coupling; and the device includes a heating assembly for warming the coupling so that fluid may readily flow therethrough in cold weather.

Background Information

Large transport trucks, trains and other equipment with trailers or rail cars often require a physical connection to activate the air braking in the towed trailer or rail car. For connecting flexible air lines in transport trucks to their trailers, or from a locomotive to the rail car, the universal standard device is a hermaphroditic coupling called a "glad hand". The air lines going to the glad hands are typically fabricated from plastic or rubber so that they are able to flex between the truck and trailer or rail cars and the locomotive as the vehicles move. A first glad hand is secured to the truck or locomotive. This first coupler is operatively engaged with the air brake system on that truck or locomotive. A second glad hand is secured to an end of a hose extending outwardly from the trailer or the rail car. The hose is operatively engaged with the air brake system on that trailer or rail car. Each of the first and second glad hands includes a rubber seal to prevent air from leaking from the system. When it is desired to connect the glad hands together, the couplers are oriented at right angles relative to each other and the seals are pressed together. One or both of the first and second glad hands is then rotated relative to the other. This rotational motion locks the glad hands together, thereby connecting the air brake system in the tractor to the trailer; or in the locomotive to the rail car. This system is also used to connect the air brake system of one trailer or rail car to the air brake system of another trailer or rail car.

Glad hands couplers are typically fabricated from aluminum die cast or other metal and they have narrow internal passageways when compared to the size of the inside diameter of the air hoses to which they are secured. Some glad hands are bolted to the rear of the truck cab or locomotive and in other applications both of the glad hands couplers are attached to hoses. Some vehicle mounted models also have shut off valves to close off the couplers when they are not connected together.

When glad hands couplers are used in cold climates where the temperature can be well below freezing, the aluminum glad hands get much colder than the air hoses to which they are connected. This can lead to a reduction in the braking capacity of the trailer because the air in the hoses and brake lines always includes some moisture, even though systems are set up to try and remove all moisture. The moisture in the system tends to collect in the passageways in the glad hands because they are narrower. Because the glad hands are fabricated from metal, any accumulated moisture tends to freeze, thereby narrowing the diameter of the passageway. This restricts the quantity of air that is able to flow through the passageways. Air brakes operate in such a manner that when insufficient pressure is built up in the system, the brakes tend to not release. As a vehicle travels through cold weather, the loss of air flow through the narrowing passageways of the glad hands will tend to cause the brakes to be applied or become slow to react. This naturally poses a potentially catastrophic danger to the vehicle. Additionally, the colder the temperature, the more difficult it is for an operator to connect glad hands together or to disconnect glad hands from each other.

SUMMARY

A portable heating device for a fluid coupling in large transport vehicles and a method of using the same is disclosed. The portable heating device warms and insulates the fluid coupling, thereby reducing the tendency of moisture to freeze in the passageways of the fluid coupling and narrow the same. Thus, the portable heating device aids in maintaining the air flow through the passageways at a level sufficient to enable the vehicle's brakes to be applied as they normally would in warmer weather. The heating device also helps reduce the tendency of moisture in the passageways freezing the components of the fluid coupling together, thus making it relatively easy for an operator to disconnect the fluid coupling when necessary.

The glad hands coupling includes a first coupling member and a second coupling member which are selectively engageable with each other. The heating device includes a jacket having a bore within which at least a portion of the fluid coupling is selectively received. The ends of the jacket define openings to the bore and these openings are selectively closed by fasteners which are engaged with a locking member. A heating assembly is provided to heat air in the bore and thereby heat the coupled first and second coupling members by convection. The heating device may also heat the first and second coupling members by conduction. When the openings to the bore are closed, the jacket retains heat therein. The jacket may include insulation and a door that is selectively openable to gain access to a shut-off valve on the coupling.

In one aspect, the invention may provide a heating device for a fluid coupling; said heating device comprising a jacket, an interior cavity defined in the jacket, wherein the interior cavity is adapted to receive at least a portion of the fluid coupling therein and a heating assembly provided to heat the interior cavity.

In another aspect, the invention may provide a heating device and a fluid coupling in combination; wherein the fluid coupling includes a first coupling member and a second coupling member which are selectively engageable with and disengageable from each other; and the heating device includes a jacket; an interior cavity defined in the jacket; wherein at least a portion of the fluid coupling is selectively receivable within the interior cavity of the jacket when the first and second coupling members are engaged with each other; and a heating assembly provided to heat the interior cavity and thereby the coupled first and second coupling members.

In another aspect, the invention may provide a method of keeping fluid communication between a first coupling member and a second coupling member of a fluid coupling in cold weather, said method comprising:

placing a jacket around the first and second coupling members when in an engaged position so that the engaged first and second coupling members are received at least partially inside a bore defined in the jacket; and activating a heating assembly to heat air in the bore and thereby heat the engaged first and second coupling members by convection and/or to heat the engaged first and second coupling members directly by conduction.

BRIEF DESCRIPTION OF THE SEVERAL VIEWS OF THE DRAWINGS

Sample embodiments of the invention are set forth in the following description, are shown in the drawings and are particularly and distinctly pointed out and set forth in the appended claims.

Similar numbers refer to similar parts throughout the drawings.

DETAILED DESCRIPTION

Figure 1:
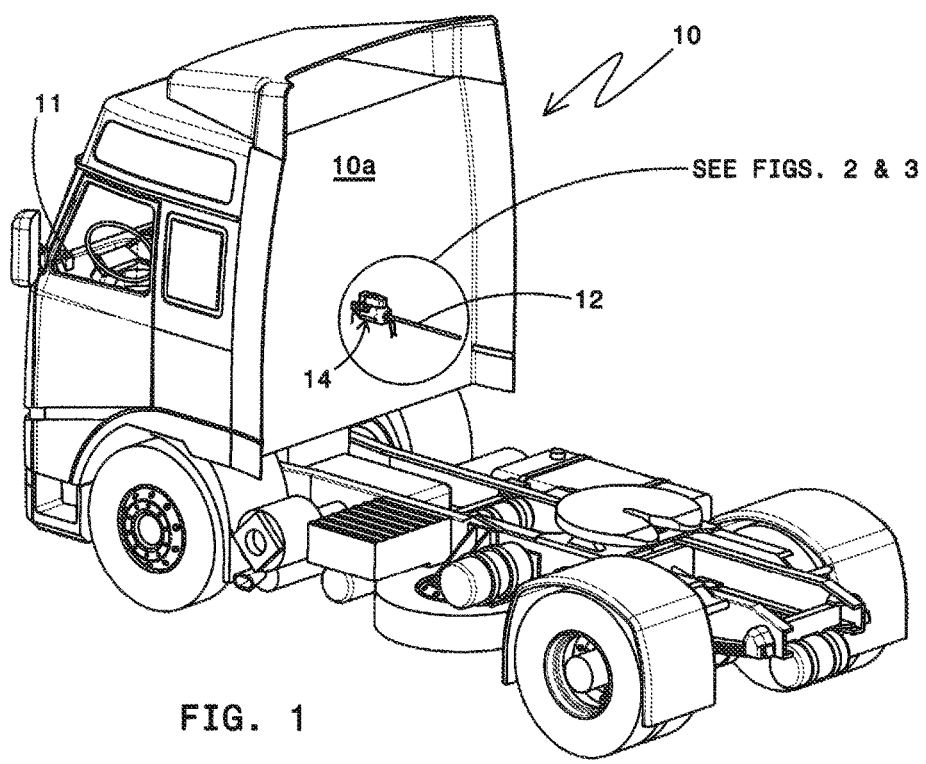
FIG. 1 is a back perspective view of a transport truck with the trailer removed for clarity and showing a heating device for a fluid coupling and further showing a first air hose extending outwardly from the heating device.

Referring to FIG. 1 there is shown a truck tractor 10 having a rear wall 10a. The figure does not show a trailer that would be engaged with tractor 10 in order that a portion of an air brake system connection is able to be seen. A first air hose 12 which would typically extend outwardly and forwardly from that trailer is illustrated in FIG. 1. The first air hose 12 extends toward rear wall 10a of tractor 10.

A heating device 14 is illustrated as being positioned at an end of first air hose 12. Although it cannot be seen from FIG. 1, heating device 14 is engaged around the coupling devices which secure first air hose 12 to an air brake system on the tractor 10.

Figure 2:
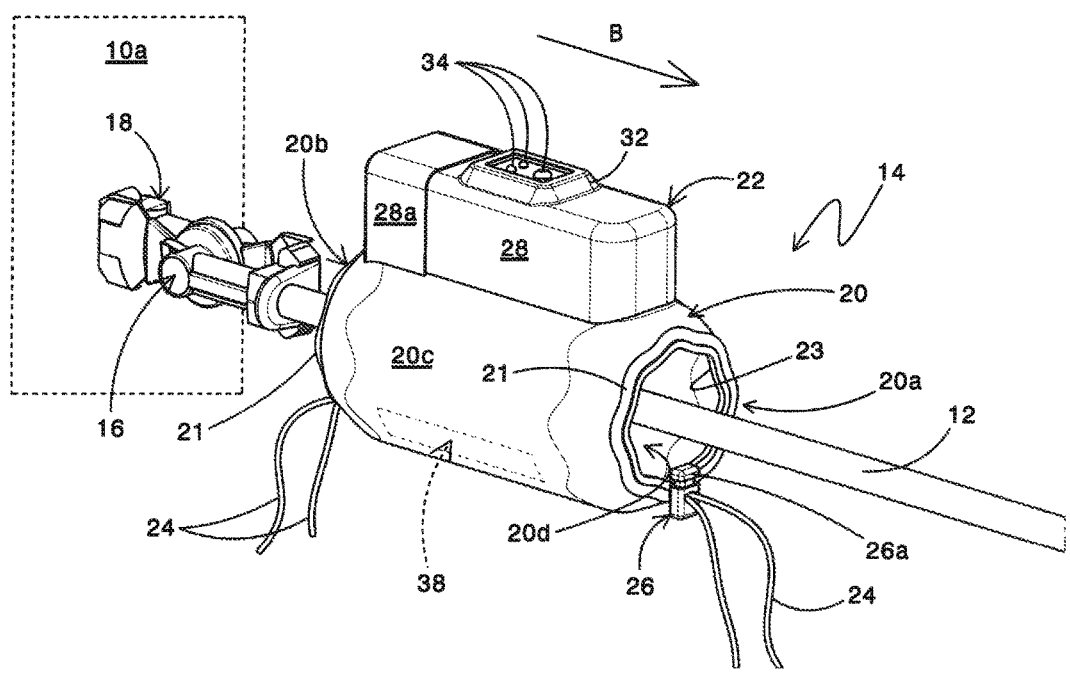
FIG. 2 is a perspective view of the heating device, showing a first glad hands coupler engaged with the first air hose and a second glad hands coupler mounted on the rear wall of the tractor; and wherein the heating devices has been moved outwardly from the rear wall to show the first and second glad hands coupled with each other, and where the jacket is in the open position.

FIG. 2 shows heating device 14 pulled away from the coupling devices. A first glad hand coupler 16 is engaged with the end of first air hose 12. A second glad hand coupler 18 is shown mounted on and extending outwardly from rear wall 10a of truck tractor 10. Second glad hand 18 is operatively engaged with the air brake system on tractor 10 and is in fluid communication with that air brake system. First and second glad hands 16, 18 are engaged with each other. First and second glad hand couplers 16, 18 are well known in the art and will not be further described herein. Suffice it to say that first and second glad hands 16, 18 are engaged with each other, first air hose 12 is brought into fluid communication with the air brake system provided on tractor 10. The tractor 10, its air brake system, the first air hose 12, first glad hand 16, and second glad hand 18 are all well known in the art.

Heating device 14 is provided for selective engagement around the coupled first and second glad hands 16, 18. Heating device 14 is a portable device that is selectively engaged with glad hands 16, 18 and may be removed therefrom whenever necessary or desired.

Heating device 14 comprises a jacket 20 and a control assembly 22 which is engaged with jacket 20. Jacket 20 is a tubular member that is generally cylindrical in shape and has a first end 20a and a second end 20b. (It will be understood that other differently configured jackets could be utilized as part of heating device 14.) A longitudinal axis "Y" (FIGS. 4 and 7) extends between first and second ends 20a, 20b. Jacket 20 includes a peripheral wall 20c which bounds and defines a bore 20d (FIG. 2) which extends between first and second ends 20a, 20b. Jacket 20 defines at least one opening to bore 20d and at least a portion of the glad hands 16, 18 or a hose engaged therewith extends through this opening. Openings 23 (FIGS. 2 and 6) are defined in each of the first and second ends 20a, 20b of jacket and provide access to bore 20d. Openings 23 are generally at right angles to longitudinal axis "Y". One or both openings 23 are selectively able to be moved between an open position and a closed position, as will be later described herein.

Jacket 20 is fabricated from a piece of flexible material that has first and second longitudinal edges that are sewn or otherwise secured together in a longitudinally oriented seam. Jacket 20 thus forms a unitary tubular component that is substantially unbroken around its circumference. A suitable material for the fabrication of jacket 20 is a nylon fabric. Although not illustrated in the attached figures, jacket 20 may additionally be provided with a suitable insulating material 21 (FIG. 4) to slow down the loss of heat generated within jacket 20, as will be described hereafter. The insulating material 21 may be provided on an interior surface of jacket 20 as illustrated in FIG. 4, or on the exterior surface of jacket 20 or be provided as a layer that is intermediate the interior and exterior surfaces of the wall that bounds cavity 20d.

Figure 3:
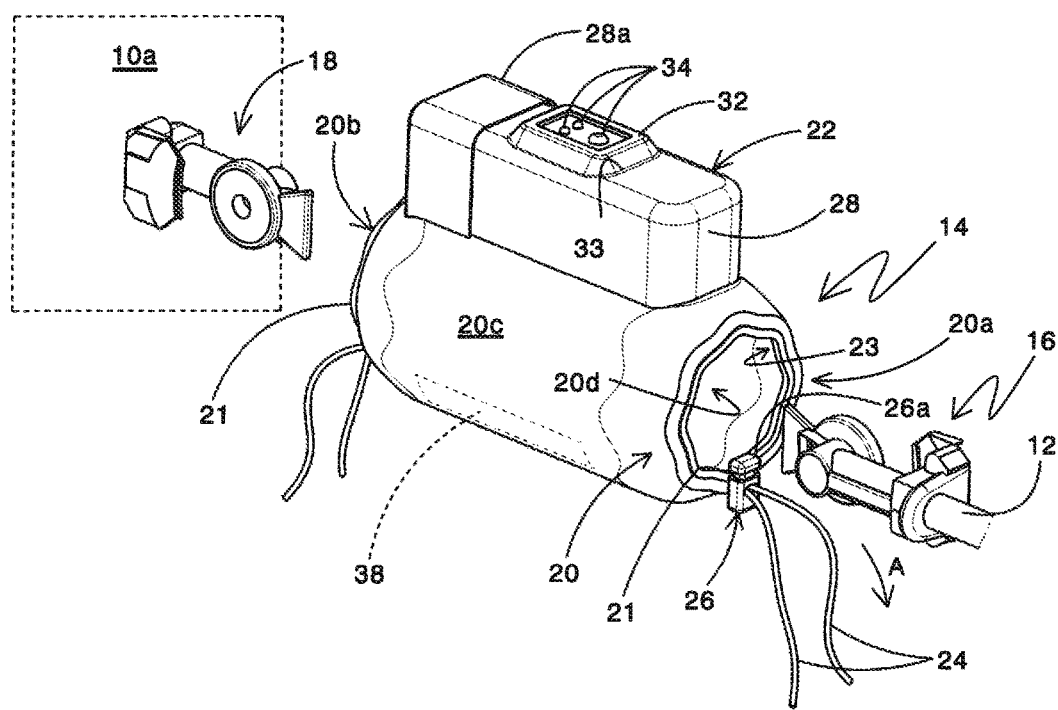
FIG. 3 is an exploded view of the heating device and the first and second glad hands uncoupled, and where the jacket of the heating device is in the open position.
Figure 6:
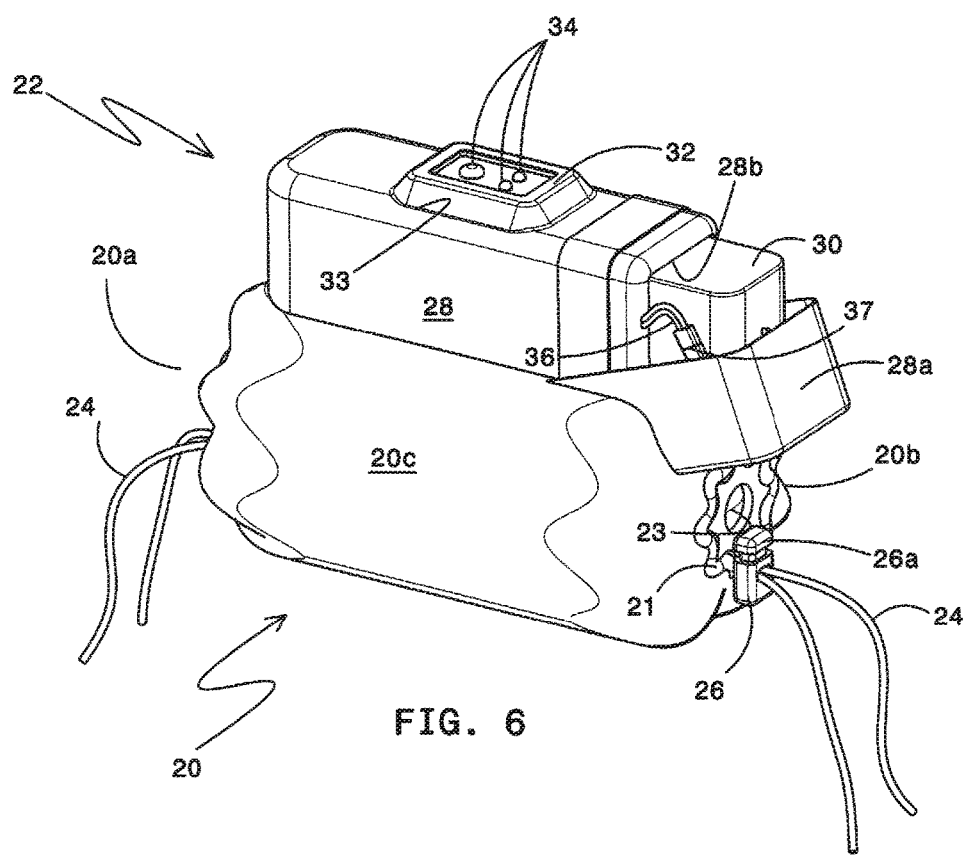
FIG. 6 is a rear perspective view of the heating device with the openings to the jacket's bore moved to a closed position and showing the access door to a battery compartment in an open position.
Figure 7:
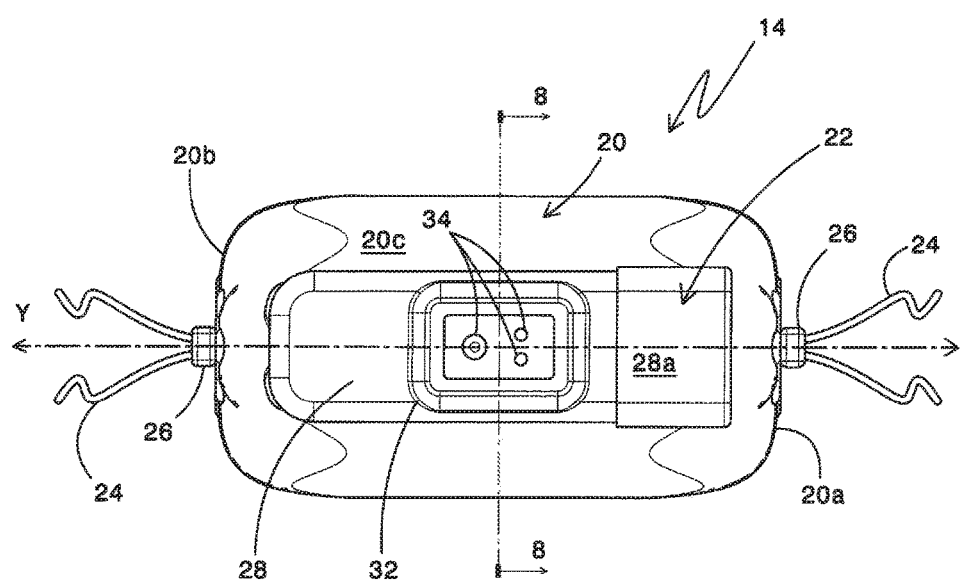
FIG. 7 is a top view of the heating device of FIG. 6.
Figure 9:
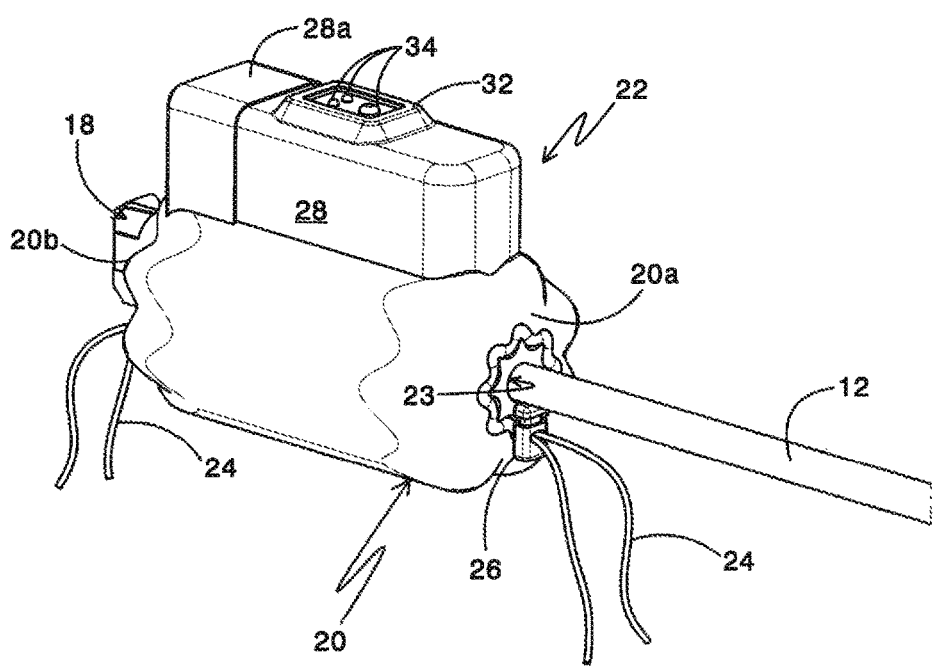
FIG. 9 is a front perspective view of the heating device engaged with the first air hose and the second glad hand as in FIG. 1 but with the opening moved to the closed position to block of access to the bore of the jacket.
Figure 10:
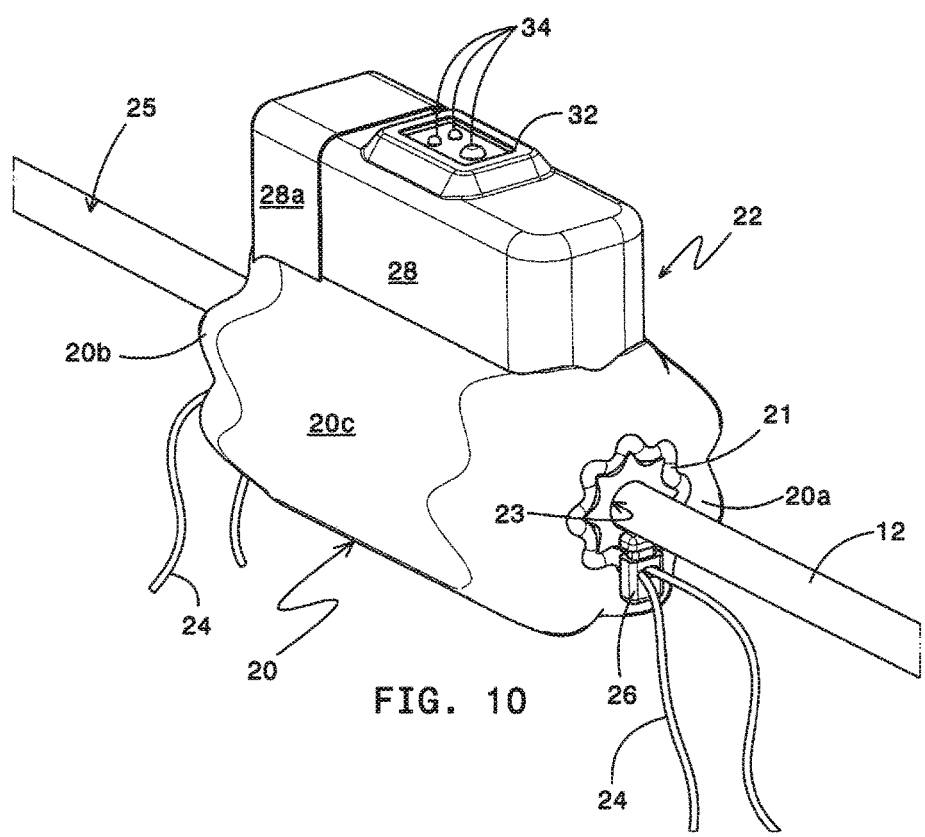
FIG. 10 is a front perspective view of the heating device engaged around a first and second air hose.

An annular pocket 21 is formed in each end 20a, 20b of the peripheral wall 20c adjacent the openings 23. A cord 24 may be threaded through each pocket 21 and subsequently through a locking mechanism 26 so that cord 24 is accessible outside of jacket. Locking mechanism 26 is a cord type locking mechanism similar to the mechanism used the cords on jackets and hoodies. In locking mechanism 26, a button 26a is depressed inwardly to allow cord 24 to be moved through mechanism 26 in either of a first and second direction. When button 26a is released, cord 24 is locked in place in mechanism 26 and is unable to move in either of the first or second directions. Cord 24 is used to gather up the fabric of jacket 20 and close the opening 23, thereby shutting off or limiting access to bore 20d. This closing of opening 23 is accomplished by depressing button 26a and then pulling a length of cord 24 through locking mechanism 26 in a first direction indicated by arrow "A" (FIG. 3). This motion causes the fabric of jacket 20 to be gathered as the length of cord 24 within pocket 21 is shortened. The circumference of the opening to bore 20d is thereby decreased in size. When the opening is closed to the desired extent, such as is illustrated in FIG. 6, button 26a is released and at that point cord 24 is held by locking mechanism 26. Consequently, the opening to bore 20d is reduced in diameter relative to the open position (FIG. 2) and access to bore 20d is substantially restricted. When it is desired to once again gain access to bore 20d, button 26a is depressed downwardly and cord 24 is moved in the opposite direction through locking mechanism 26 until the opening is once again in an open position and of a greater diameter. Access to bore 20d is then again possible. Opening 23 in first end 20a of jacket 20 is moved to the open position to allow first glad hand 16 to be inserted into bore 20d. Jacket 20 is then slid in the direction indicated by arrow "B" (FIG. 2) so that first glad had 16 exits jacket through the opening 23 in second end 20b. First and second glad hands 16, 18 are coupled together and then jacket 20 is moved back over the coupled glad hands 16, 18 in the direction opposite to arrow "B". When at least part of the first glad hands 16 and at least part of second glad hands 18 are located within bore 20d (such as is illustrated in FIG. 9), openings 23 are closed to substantially block off access to bore 20d. If second glad hand 18 is secured to a second hose 25 (FIG. 10) then both first and second glad hands 16, 18 should be retained entirely within bore 20d.

It will be understood that locking mechanism 26 may be omitted and cords 24 may simply be tied to close of access to the openings to bore 20d.

Figure 4:
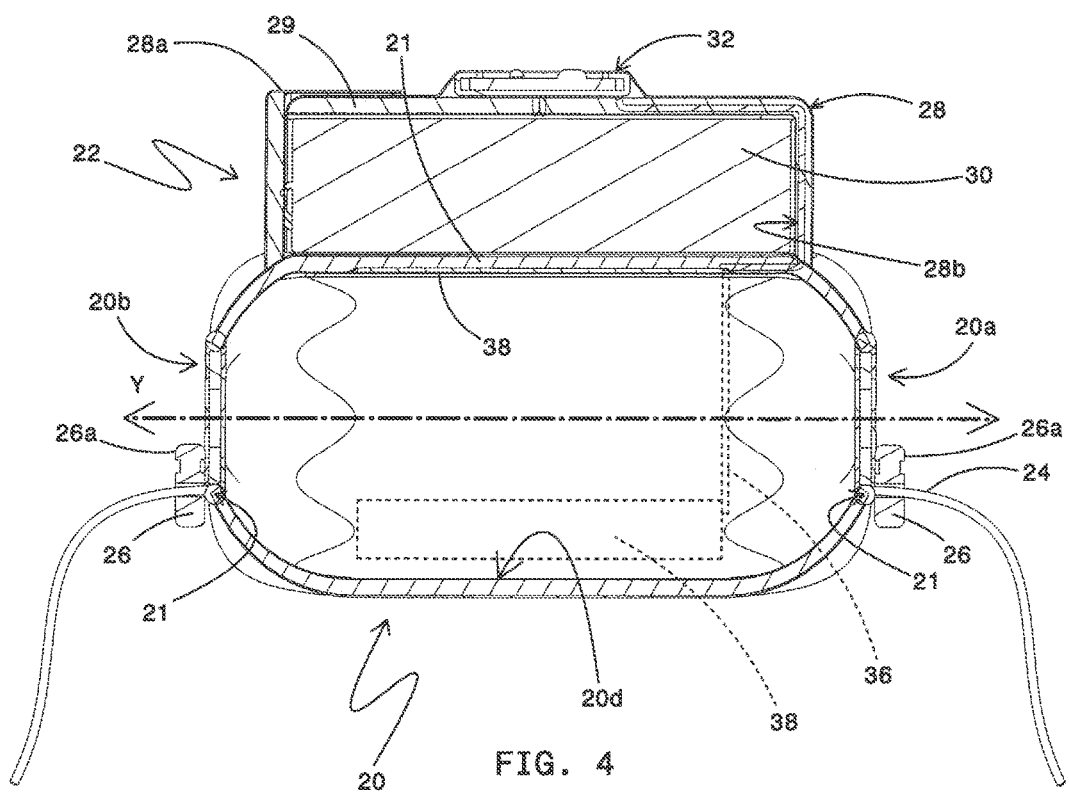
FIG. 4 is a longitudinal cross-section of the heating device of FIG. 3, where the jacket is in an open position.
Figure 5:
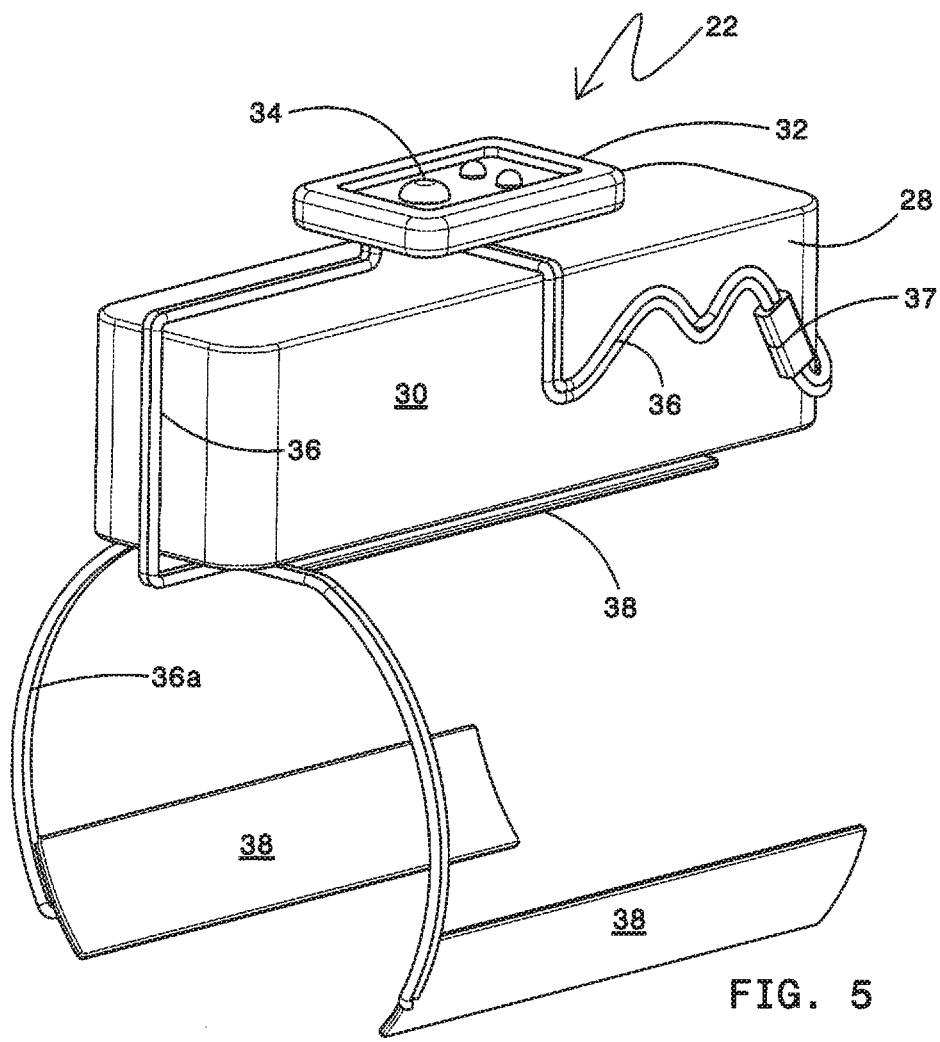
FIG. 5 is a perspective view of the control assembly of the heating device with the jacket removed therefrom so the various components of the control assembly can be seen.

Referring to FIGS. 2, 4 and 5, heating device 14 further includes a control assembly 22. Control assembly 22 includes the various components necessary for generating heat within jacket 20. Control assembly 22 may also include structural components for retaining the heat generating components but these structural components may instead be formed as part of jacket 20.

The structural components which may form part of control assembly 22 or part of jacket 20 include a compartment 28 and an access door 28a to an interior 28b (FIG. 4) of that compartment 28. Compartment 28 comprises a pocket that is provided on an exterior surface of jacket 20 and access door 28a is a fabric flap that is securable to close off access to interior 28b. Alternatively, compartment 28 may comprise a rigid case that is secured to the exterior surface of jacket 20 in any suitable manner, such as by way of an adhesive. If compartment 28 is comprised of a rigid material, access door 28a may be pivotally engaged therewith. Door 28a will then be able to be rotated between an open position (FIG. 6) to gain access to interior 28b of the compartment 28 and a closed position to shut of access to interior 28b. Compartment 28 may be insulated. Compartment 28 can be provided with insulation 29 (FIG. 4) that is separate from the insulating material 21 provided in jacket 20 or the insulating material 21 may extend into compartment 28 and insulate the same.

Figure 8:
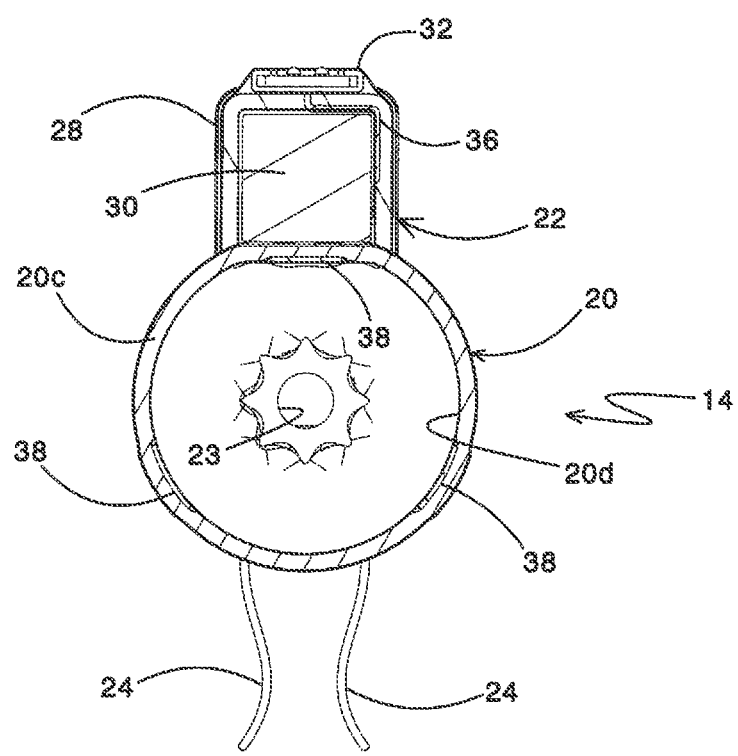
FIG. 8 is a cross-section of the heating device taken along line 8-8 of FIG. 7.

Heating device 14 includes a control assembly 22 comprising a heating assembly and a control unit 32. Control unit 32 is housed in a compartment 28 provided on jacket 20. The heating assembly includes a plurality of heat generating components that are operatively engaged with control unit 32. The heat generating components of the heating assembly are partially housed within compartment 28 and partially housed within jacket 20. The heat generating components of the heating assembly are illustrated in FIG. 5. A power source, in the form of a battery 30 (FIG. 8), is operatively engaged with the heating assembly and control unit 32. Battery 30 is sized to fit within interior 28b of compartment 28. Battery 30 is insertable into and removable from interior 28b of compartment 28 when access door 28a is moved to the open position (FIG. 6). Battery 30 is a 7.4V (13000 mAh) battery and is of a rechargeable type. (Heating device 14 may be provided with a plurality of rechargeable batteries so that one of the batteries is placed within heating device 14 while another of the batteries is being recharged in the cab of a truck or in a locomotive of a train.) It will be understood that instead of battery 30 being provided in compartment 28, control assembly 22 may be hard-wired or plugged into the tractor 10, locomotive, or rail car's electrical system.

Control unit 32 includes a hard case which extends outwardly from an aperture 33 (FIG. 6) defined in an exterior wall of compartment 28. The case houses a plurality of components therein such as a programmable CPU (central processing unit), a thermostat etc. Controls 34 such as on/off switches, LEDs (light emitting diodes) etc., are located on an outer wall of the case. A clear window (not numbered) is provided in the control unit 32 and/or in compartment 28. The window ensures that controls 34 of control unit 32 are visible and are activatable through the window. This is particularly possible if the window is made from a flexible, clear plastic. The CPU may be configured to be activated manually by depressing control buttons 34 through the clear plastic window. Alternatively, the CPU may be accessed remotely so that an operator can switch the heating device 14 on and off from a distance. As shown in FIG. 1, for example, a control unit 11 may be provided inside the cab of vehicle 10 which will allow an operator to remain in the cab and remotely activate or deactivate heating device 14. The control unit 11 may also be detachable so that the operator is able to remove the unit 11 from the cab and activate or deactivate heating device 14 from any other location within range of heating device 14. If this is the case, then an antenna may be wrapped around control unit 32, and operatively engaged with control unit 32. Although not illustrated herein control unit 32 may also include a visual display screen adjacent controls 34 to indicate the temperature of the unit. Wiring 36 connects the components within case 32 to battery 30 and to a plurality of heating elements 38 of the heating assembly. The heating elements 38 are positioned in or on an interior surface of jacket 20 and can be spaced equidistant from each other around the inner circumferential wall of jacket 20. As shown in FIG. 5, heating elements 38 extend outwardly from an arcuate base member in generally the same direction and are spaced from each other. Heating elements 38 are equidistantly positioned around the inner circumference of jacket 20. The base member is a wire 36a which is arcuate and electrically links heating elements 38 to the CPU of control unit 32. Wire 36a is generally C-shaped and is configured to be positioned adjacent the inner circumference of the jacket 20. A first end of each heating element 38 is secured to wire 36a and a second end of each heating element 38 is spaced a distance from wire 36a. Heating elements 38 are generally parallel to the longitudinal axis of jacket 20.

Battery 30 is engaged with wiring 36 via a connector 37 (FIGS. 5 and 6). Additional insulation material may be provided in the peripheral wall 20c of jacket 20 adjacent heating elements 38 to ensure that there is little to no heat loss to the surrounding air. The insulation will also help ensure that the majority of the heat generated by heating elements 38 is passed into interior cavity 20d of jacket 20.

When it is desired to warm first and second glad hands 16, 18, jacket 20 of heating device 14 is engaged around first and second glad hands 16, 18 as previously described herein. Cords 24 are pulled through locking mechanisms 26 to close openings 23. Controls 34 are engaged either manually or remotely and the system is activated to causing heating elements 38 to heat up to a desired temperature. Because openings 23 are closed, heat is retained within bore 20d of jacket 20, particularly if an insulating layer is provided within jacket 20. This heat within bore 20d keeps first and second glad hands 16, 18 warmed and thus the passageways within the glad hands 16, 18 remain open and the air is able to flow freely therethrough. When it is no longer necessary to heat glad hands 16, 18, controls 34 are engaged to switch off the heating elements. The heating elements may be shut off by the operator physically depressing controls 34 or by a signal sent from the remote control unit 11 (FIG. 1) in the cab of the vehicle or outside the cab but within range of heating device 14. Still further, heating device 14 may be provided with a sensor or thermostat which will maintain a preset temperature within the interior of device 14 and is operatively linked to the CPU in control unit 32 or to a CPU in control unit 11. The CPU in control unit 32 may include programming which will automatically switch the heating elements off when a preset maximum temperature is reached in the interior of the device 14 and switch the heating elements back on when the temperature within the interior of device 14 drops below a particular preset minimum temperature. Sensors may also be provided on heating device 14 to determine the ambient temperature (i.e., air surrounding the exterior of device 14) and to automatically switch the heating elements on when the ambient temperature drops below a preset threshold level When it is time to detach the trailer (not shown) from the tractor 10, heating device 14 is first disengaged from around the coupling between first and second glad hands 16, 18 by reversing the steps described above. The first and second glad hands 16, 18 are then disengaged from each other and finally the tractor 10 and trailer (not shown) are disengaged.

Figure 11:
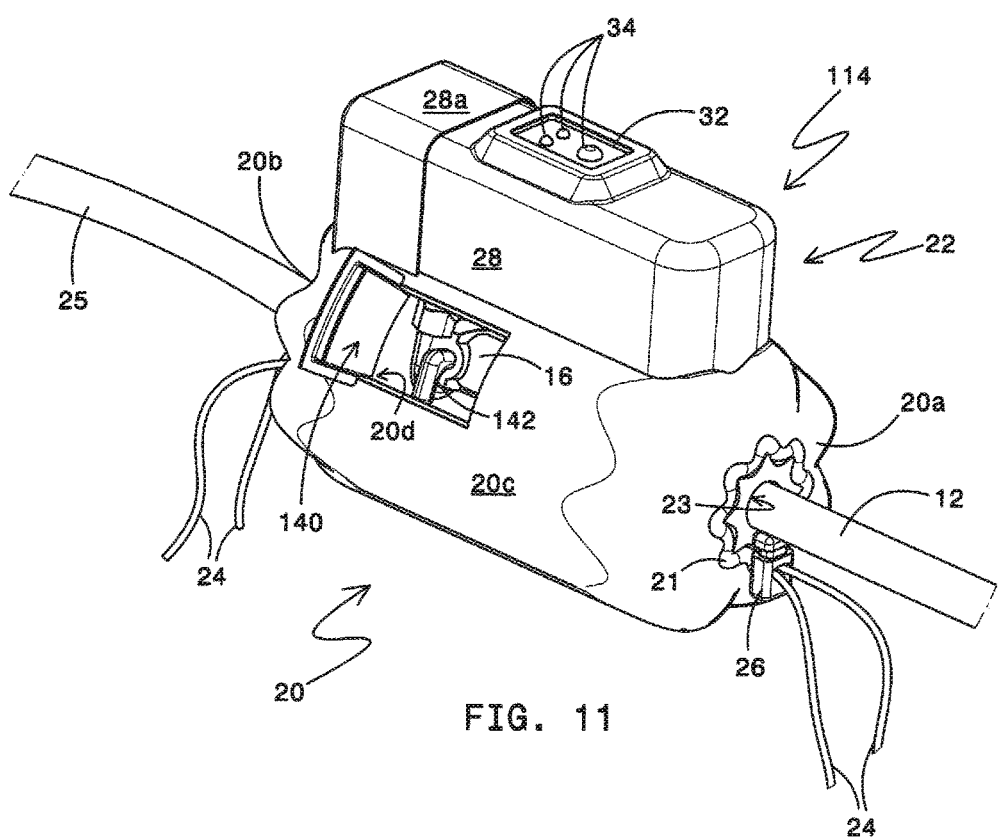
FIG. 11 is a front perspective view of a second embodiment of the heating device shown engaged around a first and second air hose and showing an access flap provided in the peripheral wall of the jacket.

FIG. 11 shows a second embodiment of a heating device, generally indicated at 114. Heating device 114 is substantially identical in structure and function to heating device 14 except that it also includes an access door 140 in peripheral wall 20c of jacket 20. Door 140 is moved to an open position as shown in FIG. 11 when it is necessary to access a shut off valve 142 on one or the other of the first and second glad hands, such as first glad hand 16. Door 140 is closed when access to bore 20d is no longer required.

FIGS. 12-15 show a third embodiment of a heating device, generally indicated at 214. Heating device 214 includes a blanket 220 and a control assembly 222. Control assembly 222 is substantially identical in structure and function to control assembly 22. Blanket 220 is similar to jacket 20 in all aspects except it is not initially shaped as a tubular member. Instead, blanket 220 may be of a generally square or rectangular configuration having opposed first and second edges 242, 244. When lifted, this blanket 220 may assume the shape of a U-shaped component (FIG. 12) with the first and second edges spaced apart but parallel to each other. First and second edges 242, 244 are generally parallel to a longitudinal axis "Y" of blanket 220; where the longitudinal axis "Y" is generally parallel to the battery (not shown but substantially identical in structure and orientation to battery 30) retained within control assembly 222. A connector is provided to secure first and second edges 242, 244 together so that blanket 220 will assume a generally identical shape to jacket 20. In the instance illustrated herein, the connector comprises a first portion 246 of a hook and loop fastener provided adjacent first edge 242 and a mating second portion 248 of hook and loop fastener 248 (FIG. 13) provided adjacent second edge 244. An elongate strip 224 of hook and loop fastener is provided on either end of first edge 242. All of the heating elements and wiring that are present in heating device 14 are also provided in heating device 214.

Figure 12:
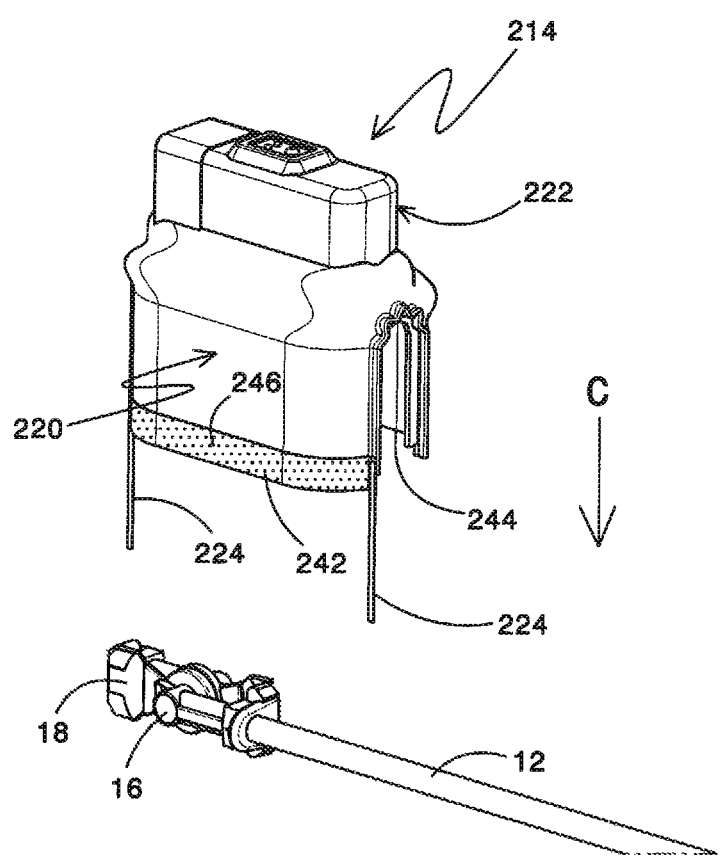
FIG. 12 is a front perspective view of a third embodiment of the heating device, with the heating device being positioned to be engaged around already-coupled first and second glad hands.
Figure 13:
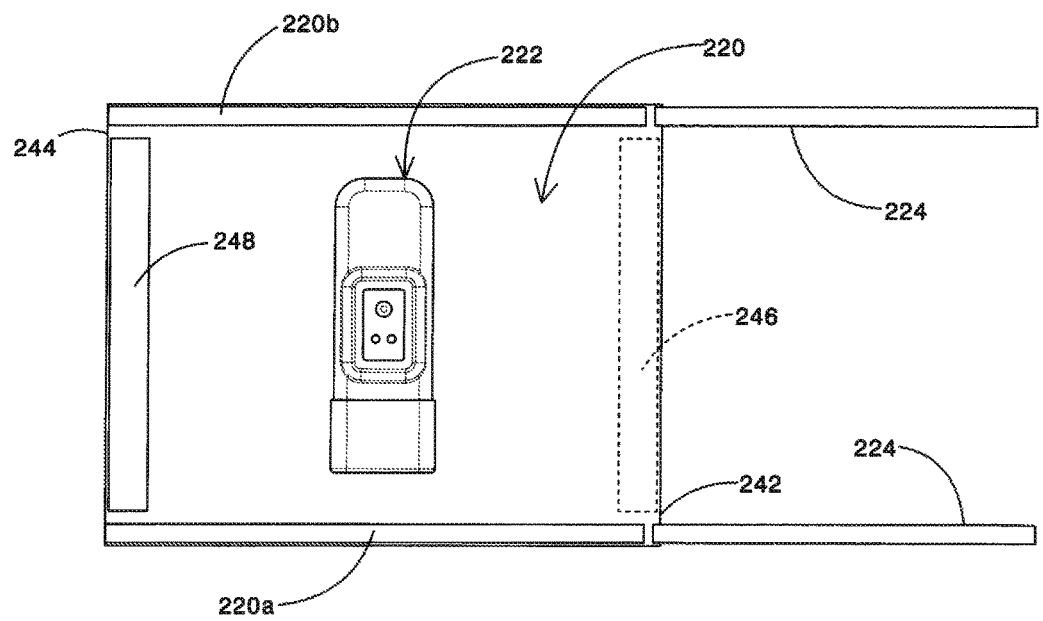
FIG. 13 is a top view of the heating device of FIG. 12 to show the hook and loop fasteners for securing a first region of the heating device to a second region thereof.
Figure 14:
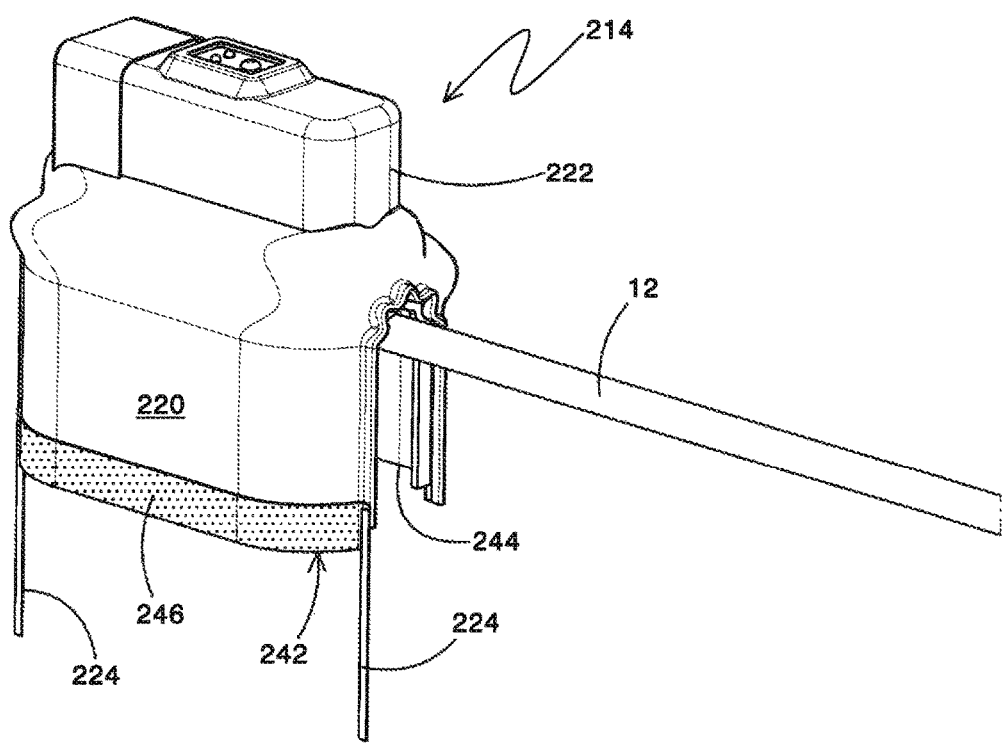
FIG. 14 is a front perspective view of the heating device positioned around the coupled first and second glad hands.
Figure 15:
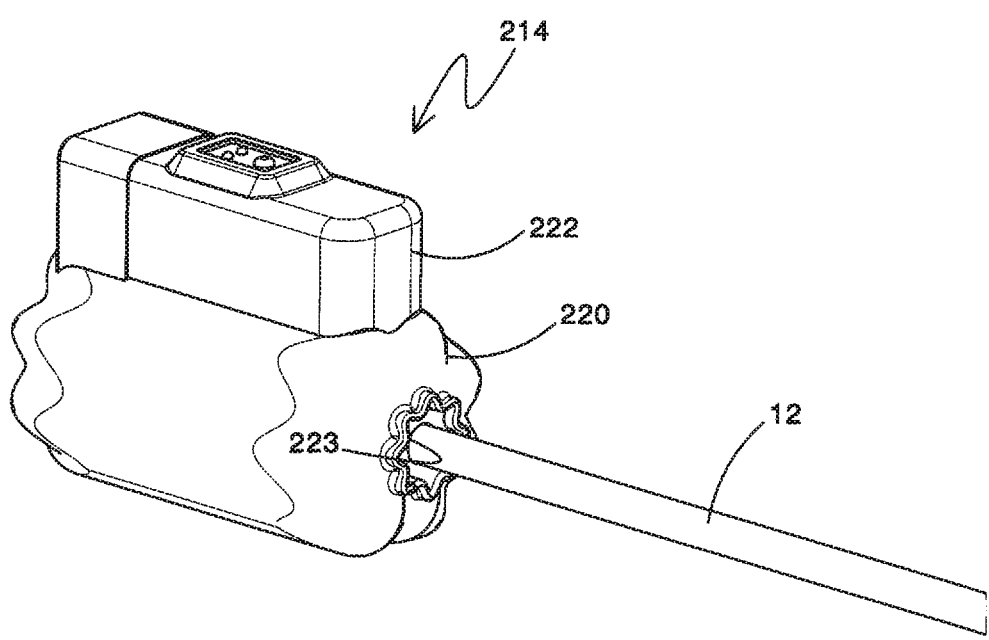
FIG. 15 shows a front perspective view of the heating device of FIG. 14 in a closed position with the opening to the bore of the jacket closed off around the first air hose.

When it is desired to use heating device 214, the device is positioned above the already-coupled first and second glad hands 16, 18 (FIG. 12) and is then lowered over the glad hands 16, 18 in the direction of arrow "C" to the position shown in FIG. 14. First and second edges 242, 244 are then overlapped with each other (so that the blanket 220 of heating device 214 goes from being generally U-shaped to generally tubular in configuration.) Hook and loop fasteners 246, 248 are then engaged with each other so that the blanket 220 forms a generally cylindrical jacket similar to jacket 20 in appearance. Elongate strips 224 are wrapped around the associated hose, such as hose 12, in order to close off the aperture through which hose 12 enters device 214. Heating device 214 is then used in the same manner as heating device 14 to warm the bore and thereby the coupled first and second glad hands. When it is desired to remove heating device 214, strips 224 are loosened, the hook and loop fasteners 246, 248 are disengaged from each other, and blanket 220 is lifted off the coupled glad hands 16, 18 in the opposite direction to arrow "C" (FIG. 12).

In one aspect, the invention may provide a method of keeping fluid communication between a first coupling member 16 and a second coupling member 18 of a fluid coupling in cold weather, said method comprising the steps of placing a jacket 20 around first and second coupling members 16, 18 when in an engaged position so that engaged first and second coupling members are received at least partially inside a bore 20d defined in jacket 20. The method further includes activating a heating assembly 30, 32, 38 to heat air in bore 20d and thereby heat the engaged first and second coupling members 16, 18. The method may further comprise the step of closing off an opening 23 to bore 20d prior to activating the heating assembly 30, 32, and 38. The step of closing off the opening includes the steps of pulling cord 24 through a locking member 26 in a first direction to reduce a diameter of opening 23 (or wrapping strip 224 around the associated hose). In respect of the cord 24, the step of pulling cord 24 through locking member 26 may be preceded by moving a button 26a on locking member 26 to permit cord 24 to be pulled through locking member 26.

The step of placing jacket 20 around first and second coupling members 16, 18 is preceded by the steps of inserting first coupling member 16 through bore 20d of jacket 20; sliding jacket 20 for a distance in a first direction "B" (FIG. 2) along a hose 12 connected to first coupling member 16; engaging first and second coupling members together 16, 18; and sliding jacket 20 in a second direction (opposite "B") until engaged first and second coupling members 16, 18 or part thereof is seated within jacket's bore 20*d*.

The method may further comprise the steps of positioning the jacket over engaged first and second coupling members 16, 18; engaging a first connector 246 on a first longitudinal edge 242 of jacket 220 with a second connector 248 on a second longitudinal edge 244 of jacket 220 such that engaged first and second coupling members 16, 18 are substantially encircled by jacket 220. The step of engaging first and second connectors 246, 248 includes pressing a first portion of a hook-type fastener with a mating second portion of a loop-type fastener.

The method may further include the step of activating heating element 38 by manually engaging controls 34 on a control unit 32 on jacket 20; or remotely accessing a CPU (not shown) contained in control unit 32 on jacket 20.

It will be understood that instead of cords 24 or strips 224 being utilized in heating devices 14, 114 or 214, other fasteners may be utilized, such as elastic bands that encircle opening 23, 223 and are stretched to permit one of the glad hands 16, 18 to be inserted through the opening and into the interior cavity (such as cavity 20*d*) of the tubular member 20 or blanket 220.

It will be understood that instead of jacket 20 being fabricated from a flexible fabric, such as nylon, jacket 20 may instead be fabricated from a rigid material, such as a hard plastic tube. The flexible fabric is likely desirable because it is relatively easy to make pockets for heating elements 38 and the battery 30; to fabricate access doors 140; and to pull cords 24 or wrap strips 224 to gather up excess fabric when openings 23 are moved to the closed position. Additionally, the flexible fabric allows for heating device 14 to be folded for storage and be relatively compact, particularly if battery 30 is removed.

Figure 16:
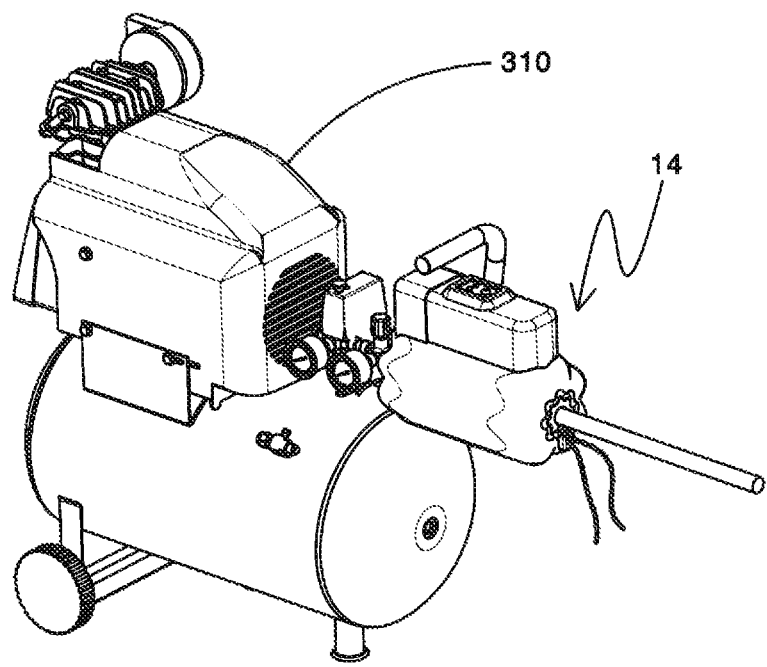
FIG. 16 shows a perspective view of an air compressor system in which the heating device may be utilized.
Figure 17:
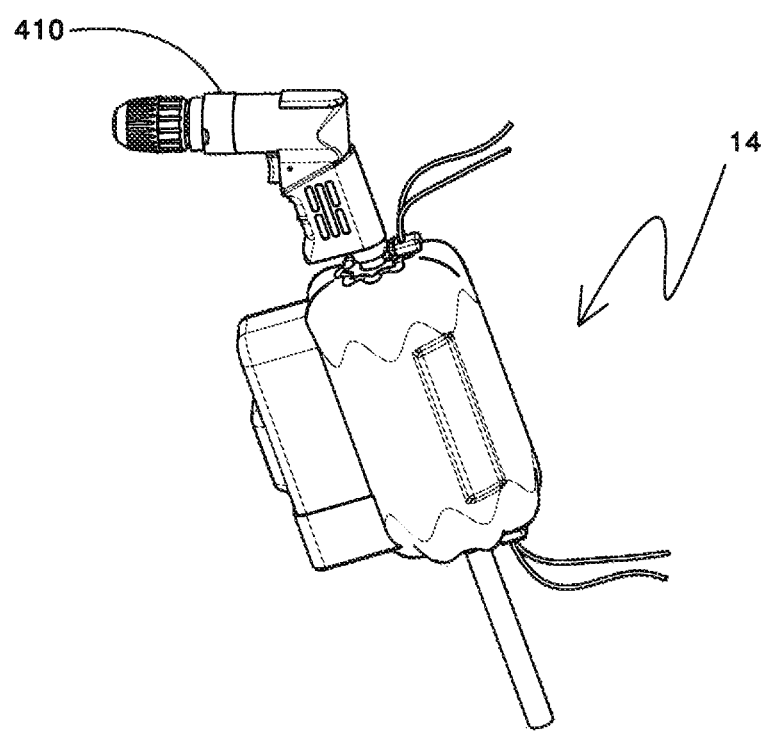
FIG. 17 shows a perspective view of an air tool system in which the heating device may be utilized.

It will be understood that the device of the present invention may be utilized with a wide variety of fluid couplings used in systems other than air brake systems for vehicles. For example, FIG. 16 and FIG. 17 show the heating device 14 used in a system that includes other types of fluid hose couplings. Such systems include an air compressor assembly 310 (FIG. 16) or an air tool or air tool assembly 410 (FIG. 17). Any other systems which use couplings that could benefit from being heated are contemplated for being suitable for the use of device 10. In other instances, it may be desirable to cool fluid couplings. In those instances, instead of heating elements being utilized within the jacket of device 14, cooling elements such as piezoelectric devices could be used. The rest of the device 14 could remain unchanged.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the preferred embodiment of the invention are an example and the invention is not limited to the exact details shown or described.

The invention claimed is:

1. A heating device for a fluid coupling; said heating device comprising:
    a jacket;
    an interior cavity defined in the jacket, wherein the interior cavity is adapted to receive at least a portion of the fluid coupling within the interior cavity, and wherein the fluid coupling includes a first coupling member and a second coupling member which are selectively engageable with and disengageable from each other;
    a first opening at an end of the jacket and defined by the jacket and a first fastener provided on the jacket around a circumference of the first opening, said first fastener being selectively operable in a first instance to reduce the first opening, said first fastener being selectively operable in a second instance to increase the first opening; and
    a heating assembly provided to heat the interior cavity.

2. The heating device as defined in claim 1, wherein the jacket has a first end and a second end and wherein the interior cavity is a bore of the jacket; and wherein the first opening to the bore is defined in one of the first and second ends of the jacket; and wherein the first fastener is provided at the one of the first and second ends of the jacket and adjacent the first opening.

3. The heating device as defined in claim 2, further comprising a second opening to the bore defined at the other of the first and second ends of the jacket; and wherein the heating device further comprises a second fastener provided at the other of the first and second ends; said second fastener being selectively operable in a first instance to decrease access to the bore through the second opening; and the second fastener being selectively operable in a second instance to increase access to the bore through the second opening.

4. The heating device as defined in claim 3, wherein at least one of the first and second fasteners is a cord or a strip of hook and loop fastener material.

5. The heating device as defined in claim 4, wherein the at least one of the first and second fasteners is the cord and the heating device further comprises a locking member which is engaged with the cord; and
    wherein the cord is movable through the locking member in a first direction to gather an associated one of the first and second ends inwardly to close off the associated first or second opening and decrease access to the bore; and the cord is movable through the locking member in a second direction to release the gathered one of the first and second ends to open the associated first or second opening and increase access to the bore.

6. The heating device as defined in claim 1, wherein the jacket is a portable member that is adapted to be selectively engaged and disengaged around the portion of the fluid coupling.

7. The heating device as defined in claim 1, wherein the jacket is fabricated from a flexible material.

8. The heating device as defined in claim 1, wherein the jacket is a tubular member that is generally cylindrical in shape.

9. The heating device as defined in claim 8, wherein the tubular member includes a circumferential peripheral wall which is continuous and unbroken around its circumference.

10. The heating device as defined in claim 8, wherein the tubular member includes a peripheral wall having a first edge and an opposed second edge; and wherein a connector is provided on the first and second edges to selectively engage the first and second edges together.

11. The heating device as defined in claim 10, wherein the connector comprises mating hook and loop fasteners provided on the first and second edges.

12. The heating device as defined in claim 1, wherein the heating assembly includes one or more heating elements provided in the jacket and a power source operatively engaged with the heating assembly; said power source configured to be activated to cause the one or more heating elements to generate heat.

13. The heating device as defined in claim 12, wherein the one or more heating elements comprise two or more heating elements, and wherein the two or more heating elements are spaced equidistantly around an inner circumference of the jacket.

14. The heating device as defined in claim 12, further comprising a C-shaped base member operatively engaged with a control unit and wherein the one or more heating elements comprise three heating elements that extend outwardly from the C-shaped base member; and wherein the three heating elements are spaced a distance apart from each other.

15. The heating device as defined in claim 12, wherein the power source is a battery retained within a pocket on the jacket.

16. The heating device as defined in claim 12, further comprising a control unit operatively engaged with the heating assembly and the power source.

17. The heating device as defined in claim 16, wherein the control unit is remotely operable.

18. The heating device as defined in claim 16, wherein the control unit is hard wired or plugged into a transport vehicle's electrical system.

19. The heating device as defined in claim 1, further comprising insulation provided in the jacket.

20. The heating device as defined in claim 1, further comprising an access door defined in a peripheral wall of the jacket; said access door being movable between an open position and a closed position; and when in the open position, the access door provides access to the interior cavity of the jacket.

21. The heating device as defined in claim 1, wherein the coupling is an air compressor fitting.

22. The heating device as defined in claim 1, wherein the coupling is part of an air tool.

23. The heating device as defined in claim 1, further comprising a base member operatively engaged with a control unit, wherein the heating assembly includes one or more heating elements provided in the jacket to generate heat, and wherein the one or more heating elements extend outwardly from the base member.

24. A heating device and a fluid coupling in combination, wherein the fluid coupling includes a first coupling member and a second coupling member which are selectively engageable with and disengageable from each other; and the heating device includes a jacket; an interior cavity defined in the jacket, wherein at least a portion of the fluid coupling is selectively receivable within the interior cavity of the jacket when the first and second coupling members are engaged with each other; a first opening at an end of the jacket and defined by the jacket and a first fastener provided on the jacket around a circumference of the first opening, said first fastener being selectively operable in a first instance to reduce the first opening, said first fastener being selectively operable in a second instance to increase the first opening; and a heating assembly provided to heat the interior cavity and thereby the coupled first and second coupling members.

25. The combination as defined in claim 24, wherein the fluid coupling comprises part of an air brake system of a vehicle, and wherein the fluid coupling is a glad hands coupling.

26. The combination as defined in claim 24, wherein the jacket is selectively engageable with and disengageable from around the engaged first and second coupling members.

27. The combination as defined in claim 24, wherein the jacket is portable.

28. The combination as defined in claim 24, wherein the heating assembly is selectively activated and deactivated by remote control.

* * * * *